(12) United States Patent
Betz et al.

(10) Patent No.: US 10,614,200 B2
(45) Date of Patent: *Apr. 7, 2020

(54) LOGIN INTERFACE SELECTION FOR COMPUTING ENVIRONMENT USER LOGIN

(71) Applicant: Microsoft Technology Licensing, LLC, Redmond, WA (US)

(72) Inventors: Adam James Betz, Kirkland, WA (US); Wade H. Curtiss, Kirkland, WA (US); Andrew Stuart Glass, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,742

(22) Filed: May 6, 2019

(65) Prior Publication Data

US 2019/0258784 A1 Aug. 22, 2019

Related U.S. Application Data

(63) Continuation of application No. 15/584,022, filed on May 2, 2017, now Pat. No. 10,282,529, which is a continuation of application No. 13/485,683, filed on May 31, 2012, now Pat. No. 9,639,676.

(51) Int. Cl.
*G06F 21/00* (2013.01)
*G06F 21/31* (2013.01)
*H04W 12/06* (2009.01)
*H04W 12/08* (2009.01)
*H04W 88/02* (2009.01)

(52) U.S. Cl.
CPC ............ *G06F 21/31* (2013.01); *H04W 12/06* (2013.01); *H04W 12/0806* (2019.01); *G06F 2221/2149* (2013.01); *H04W 88/02* (2013.01)

(58) Field of Classification Search
CPC .............................. G06F 21/31; H04L 63/083
USPC ............................................................ 726/7
See application file for complete search history.

(56) References Cited

U.S. PATENT DOCUMENTS 7,616,764 B2 * 11/2009 Varghese ................ G06F 21/36
380/255

* cited by examiner

*Primary Examiner* — Longbit Chai
(74) *Attorney, Agent, or Firm* — Alleman Hall Creasman & Tuttle LLP (57) ABSTRACT

A device may provide a login process to authenticate users prior to admittance to a computing environment. The device may also enable users to adjust various the computing environment, e.g., the language selected for communicating with the user and the user interfaces to be presented to the user, and may store such adjustments in a secured user account. However, if the user account is inaccessible to the device during the login process, the device is unable to adapt the login process to apply the user's adjustments. Instead, the device may be configured to store users' adjustments (including language selection) outside of the user accounts, and to, upon identifying the user during the login process, present login interfaces specified in the user account. Additionally, users may select different login interfaces during login, and the device may retrieve these login interfaces for selection during future login processes for the same user.

20 Claims, 7 Drawing Sheets

LOGIN INTERFACE SELECTION FOR COMPUTING ENVIRONMENT USER LOGIN

CROSS-REFERENCE TO RELATED APPLICATIONS

This application is a continuation of U.S. patent application Ser. No. 15/584,022, filed May 2, 2017, which is a continuation of, and claims priority under 35 U.S.C. § 120 to, U.S. patent application Ser. No. 13/485,683, also entitled "LOGIN INTERFACE SELECTION FOR COMPUTING ENVIRONMENT USER LOGIN," filed on May 31, 2012, now granted as U.S. Pat. No. 9,639,676, the entirety of each of which are hereby incorporated by reference as if fully rewritten herein.

BACKGROUND

In the field of computing, many scenarios involve a presentation of a login interface for a user to complete a login process. For example, a device may present a textbox pair to receive a username and a password, or a numeric keypad to enter a numeric passcode. The device may compare the text entry to authentication credentials stored in the user's profile, and in the event of a match, may admit the user to the computing environment.

As another aspect in the field of computing, many scenarios involve the configuration of a device to support variations in the computing environment to suit the interests of the user. For example, the user may select a language from among a set of available languages, and may communicate with the user within the computing environment using a selected language. In addition to translating text to and from the selected language, the computing environment may also adjust other aspects based on the selected language, such as adjusting user interfaces based on the text direction of the selected language and presenting data types in a data format associated with the selected language (e.g., presenting dates in a mm-dd-yyyy or dd-mm-yyyy format). Additionally, the user may adjust other aspects of the computing environment, such as the set of input devices available to the user; the presentation of particular types of user interfaces, such as an on-screen keyboard; and accessibility features, such as high-contrast color schemes and large font sizes for users with poor vision and audible user interfaces for users with no vision. Information about users' selections to adjust the computing environment may be stored in a user account, such as a local or roaming user profile. Additionally, the user profile of a user may be secured, e.g., through encryption or data access policies, and may be accessible to the device only after the user completes the login process (e.g., the user profile may be encrypted based in part on the password of the user, which may not be directly stored by the device, and may be usable only when provided by the user).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Difficulties may arise in the intersection of the login process of the computing environment and the user's selected adjustments of the computing environment to support features such as selected languages. In particular, it may be desirable to present the login process in the user's selected language, and, optionally, with other adjustments, such as the user's selected accessibility features and/or user interfaces. Indeed, in some scenarios, a completion of the login process may depend upon such adjustments; e.g., a user may not be able to understand the login process if presented in an unfamiliar language or without applying the user's accessibility selections, and/or may have a username or password including characters in a language that is not supported by the login interface. Moreover, if the user's profile is secured prior to completing the login process, the device may be unable to access the user's selections during the login process; e.g., even after identifying the user, the device may be unable to adjust the login process to utilize the user's language selections if this information is stored only in the secured user profile.

Presented herein are techniques for configuring devices to adapt the login process in view of the selections of a user attempting to complete the login process. In accordance with these techniques, the device may store a set of login interfaces that vary in different respects (e.g., presenting different text languages; including user interfaces adapted to different languages; and/or featuring particular input devices or user interfaces). The device may also be configured to store a set of associations of user accounts and login interfaces, such that, upon identifying a user (as a preliminary or intermediate stage of the login process), the device may identify the login interfaces associated with the user account of the user, and may present the selected login interfaces during the remainder of the login process. Additionally, the associations of user accounts and selected login interfaces may be stored outside of the secured user accounts (either alternatively or redundantly with language selections stored within the user accounts), and may therefore utilize this information before the completion of the login process that confers access to the secured user account. In this manner, the configuration of the device may adapt the login process based on the user's selections of the user representing the selected languages, user interfaces, accessibility features, data types, and other user interface variants, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a device featuring a computing environment that is protected by a login process, whereby users may present credentials that identify and authenticate the user. These credentials may involve, e.g., a username; a password or passcode; a question involving an answer known only to the user; a distinctive activity, such as recognizing an image; biometric identifiers such as face, voice, retina, or thumbprint recognition; or certificates, tickets, or tokens generated by other authenticating services to identify the user. These login credentials may be compared with or tested against information stored by the device in a user profile of the user in order to verify the login credentials before admitting the user to the computing environment.

Additionally, the computing environment to which the user is admitted may be customized on behalf of the user in various ways. For example, the user may specify one or more languages in which the user is fluent, and the computing environment may adjust the input and output interfaces to communicate with the user in the selected languages. This language adaptation may involve extensive adjustments, including adjusting the behavior of input interfaces based on the text direction of the written language (e.g., configuring textboxes to receive text in a right-to-left order for languages with a right-to-left text direction) and data formats (e.g., presenting date values in a mm-dd-yyyy or dd-mm-yyyy format based on the selected language). The user interface may also be adjusted in other ways (e.g., using a set of accessibility features, such as high-contrast color schemes and large font sizes suitable for users with poor vision, and audio-only interfaces for blind users, and/or a set of aesthetic selections, such as a color scheme or font that the user 106 selects for the login process 114). These settings are often stored in a user account, such as a user profile that may be stored locally or remotely. Additionally, user accounts are often secured, e.g., through encryption or data access security policies, such that only the user associated with the user account may access these details. In many such configurations, the user account may be encrypted and inaccessible until the user provides login credentials, which the login process may use to decrypt and access the user profile. For additional security, the device may not even store the user's login credentials, but may simply use information derived from them for the decryption process. In this manner, the information in the user account, including the user's selected languages and other settings, may be protected from unauthorized access by other users.

Figure 1:
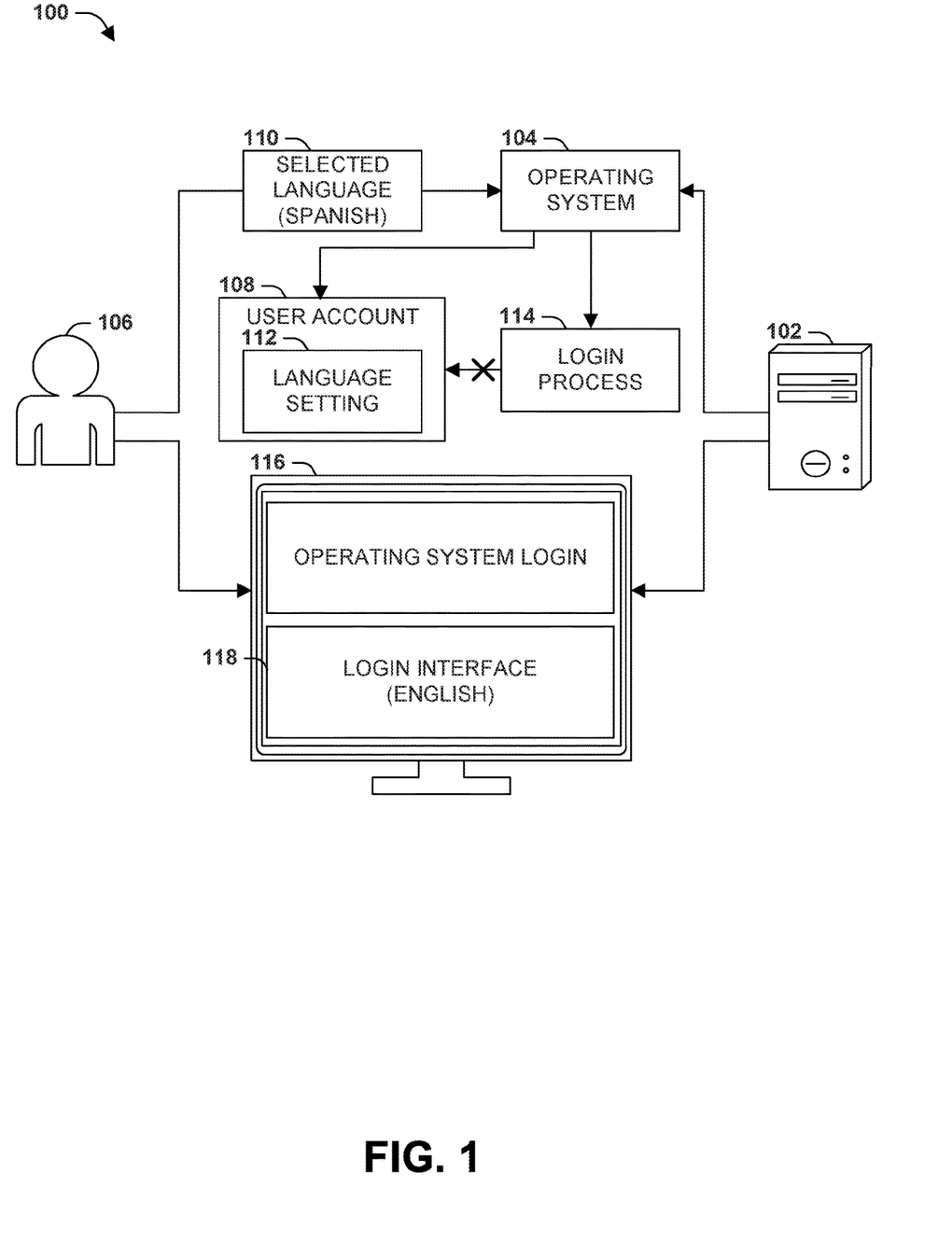
FIG. 1 is an illustration of an exemplary scenario featuring a device configured to present a login interface to a user having a user account.

FIG. 1 presents an illustration of an exemplary scenario 100 featuring the presentation of both techniques. In this exemplary scenario 100, a device 102 featuring an operating system 104 may be accessed by a user 106 represented by a user account 108. The user 106 may have selected one or more languages 110 to be used by the operating system 104 while communicating with the user 106, which the operating system 104 may store in the user account 108 of the user 106 as a language setting 112. Additionally, when the user 106 requests admittance to the computing environment of the device 102, the operating system 104 may identify and verify the user 106 by presenting a login process 114, such as a username and password combination. The user 106 may interact with a login interface 118 presented on a display 116 of the device 102 (and, optionally, other input components of the device 102, such as a keyboard, mouse, touch interface, camera, microphone, and/or biometric sensor) to provide the requested login credentials in order to satisfy the login process 114 and gain admittance to the computing environment of the device 102. Completing the login process 114 may also enable the device 102 to access the user account 108 of the user in order to apply the user's settings, such as the language setting 112 identifying the user's selected language 110. In this manner, the device 102 may implement the login process 114 while also protecting and utilizing the user account 108 of the user 106.

However, the exemplary scenario 100 of FIG. 1 may illustrate some limitations and conflicts arising within this architecture. In particular, the security mechanisms of the user account 108 may prevent the device 102 from accessing the user account 108 of the user 106 until the user 106 completes the login process 114. However, the use 106 may be unable to complete the login process 114 unless the user login interface 118 is adjusted to reflect the settings specified in the user account 108. As a first example, the login process 114 may not be able to access the language setting 112 within the user account 108, and may be unable to determine the selected language 110 of the user 106. The login process 114 may therefore present a login interface 118 using a language 110 that the user 106 does not understand, thus interfering with the user's completion of the login process 114. As a second example, the login credentials of the user 106 may include characters that are particular to the selected language 110 of the user, but the user interface 118 presented by the login process 114 may not permit such characters. For example, the login interface 118 or input components of the device 102 may include a keyboard featuring an ANSI mechanical layout, but the user's credentials may include Greek characters that are not available in this mechanical layout. As another example, the user account 108 may specify a set of accessibility settings (such as a large font size) that may not be applied to the login interface 118, and the user 106 may have difficulty completing the login process 114 without the application of these accessibility settings. These and other complications may arise from the inability of the login process 114 to adapt the login interface 118 based on the user account 108 of the user 106, due to the inaccessibility of the user account 108 during the login process 114.

B. Presented Techniques

Presented herein are techniques for alleviating the conflict between the secured storage of a user account 108 of a user and the adaptation of the login process 114 to reflect a selected language 110 and other settings requested by the user 106. In accordance with these techniques, while the user account 108 may remain inaccessible until the completion of the login process 114, the device 102 may be configured to (also) store language settings 112, selections of accessibility features, and other such details outside of the user account 108, in a manner that is associated with the user account 108 of the user 106. While the user account 108 of the user 106 may contain sensitive information (e.g., the user's passwords, financial information, and private communications) to be secured by the security protocol, such security considerations may be less significant for the language settings 112 and similar information for the login process 114, and it may be acceptable to store such information outside of the secured user profile 108.

When the user 106 initiates the login process 114, a default login interface 118 may be presented. When the user 106 selects a user account 108 (e.g., inputting a username), the login process 114 may examine the language settings 112 and other information that is associated with (but stored outside of) the user account 108 of the user 106, and may adjust the login interface 118 (e.g., to communicate with the user 106 in the user's selected language 110), thereby facilitating the user 106 in completing the login process 114 while maintaining the security of the user account 108.

Figure 2:
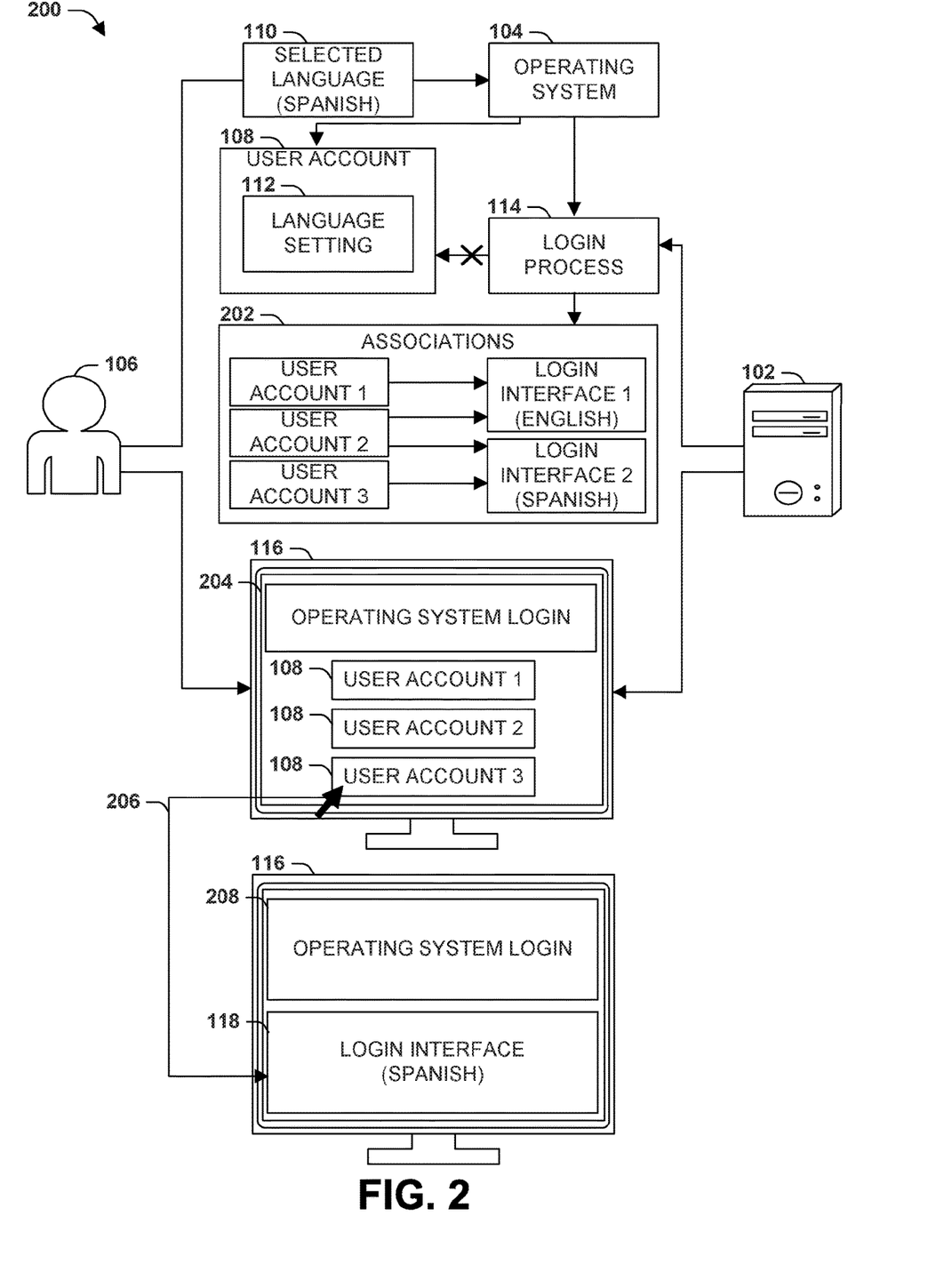
FIG. 2 is an illustration of an exemplary scenario featuring a device configured to adjust a login process for a user based on associations of the user account of the user with a selected login interface (such as a user's selected language) in accordance with the techniques presented herein.

FIG. 2 presents an illustration of an exemplary scenario 200 illustrating the use of the techniques presented herein. In this exemplary scenario 200, a device 102 may present an operating system 104 that enables a user 106 having a user account 108 to specify a selected language 110, reflected by a language setting 112 stored in the user account 108, and may also secure the user account 108 until the user 106 completes a login process 114 to request admittance to the computing environment of the device 102. The login process 114 may involve a login interface 208 presented on a display 116. However, in contrast with the exemplary scenario 100 illustrated in FIG. 1, the device 102 in this exemplary scenario 200 may enable the login process 114 to adapt to the language settings 112 and other settings selected by the user 106, even though such information is stored in the secured user account 108 that is inaccessible during the login process 114. This functionality may be achieved by configuring the device 102 and/or operating system 104 to store, outside of the user account 108, a set of associations 202 of login interfaces 208 associated with respective use accounts 108. When the user 106 initiates the login process 114, the device 102 may present on the display 116 a first login presentation 204, comprising an enumeration of the user accounts 108 registered with the login process 114 and computing environment. Upon receiving from the user 106 a selection 206 of a user account 108, the device 102 may examine the associations 202 to identify the login interfaces 208 associated with the user account 108, and may generate a second login presentation 208 presenting the login interfaces 118 reflecting the selected language 110 and other settings selected by the user 106. In this manner, the device 102 may adapt the login process 114 to reflect the language settings and other selections of the user 106 while maintaining the security of the user account 108 through the implementation of the techniques presented herein.

C. Exemplary Embodiments

Figure 3:
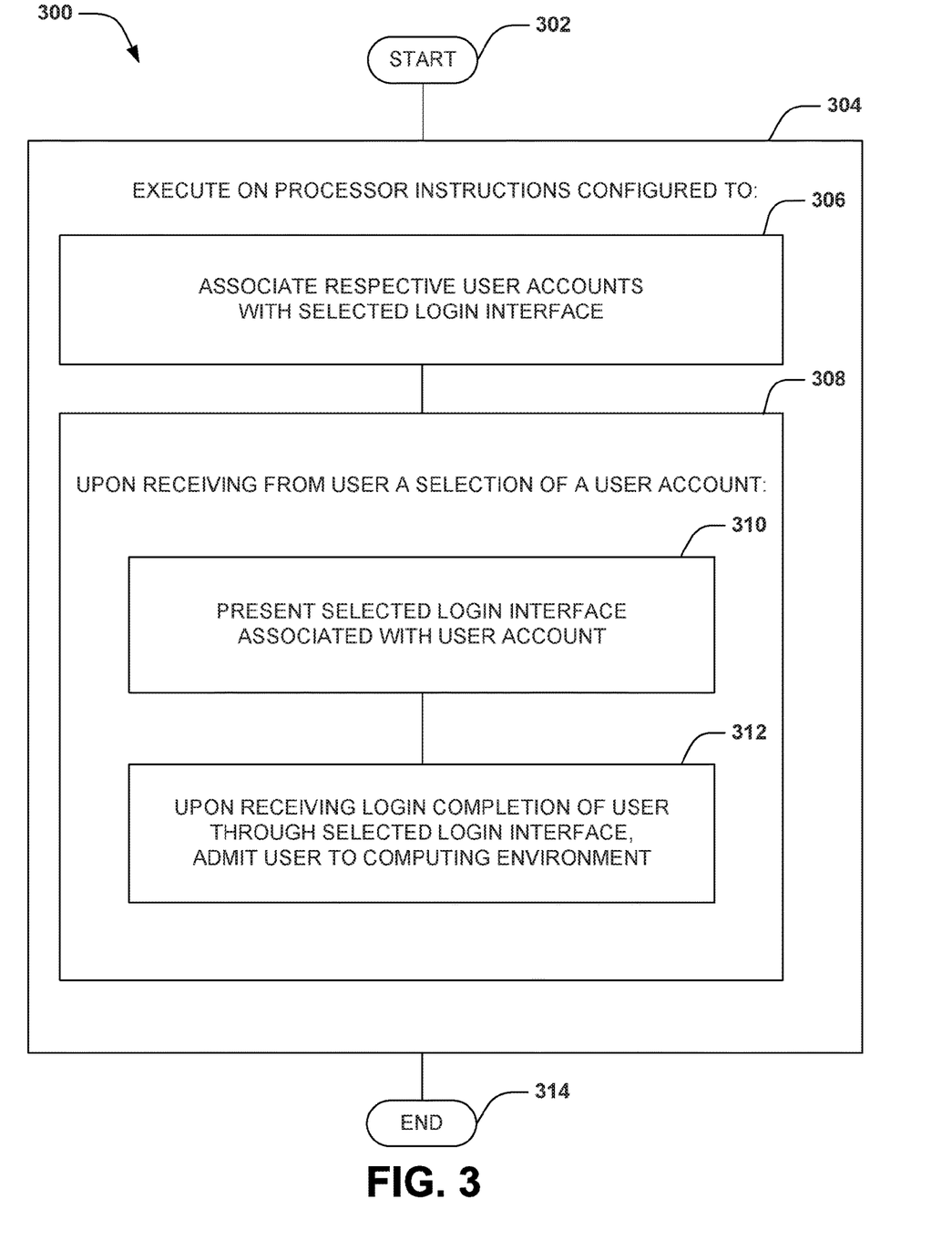
FIG. 3 is a flow chart illustrating an exemplary method of presenting login interfaces within a computing environment in accordance with the techniques presented herein.

FIG. 3 presents a first exemplary embodiment of the techniques presented herein, illustrated as an exemplary method 300 of configuring a device 102 having a processor, a set of login interfaces 118, and a set of user accounts 108, to admit users 106 to a computing environment through a login process 114. The instructions may be implemented, e.g., as a set of instructions stored in a memory component of the device 102 (e.g., a memory circuit, a platter of a hard disk drive, a solid-state storage device, or a magnetic or optical disc) that, when executed on a processor of the device 102, causes the device 102 to perform the techniques presented herein. The exemplary method 400 begins at 402 and involves executing 404 the instructions on the processor of the device 102. In particular, the instructions are configured to associate 306 respective user accounts 108 with a selected login interface 118. The instructions are also configured to, upon receiving 308 from a user 106 a selection of a user account 108, present 310 the selected login interface 118 associated with the user account 108; and upon receiving a login completion of the user 106 through the selected login interface 118, admit 312 the user 106 to the computing environment. In this manner, the exemplary method 300 of FIG. 3 causes the device 102 to admit users 106 to the computing environment through the login process 114 adjusted according to the selected languages 110 and other settings of the user 106, and so ends at 314.

Another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 4:
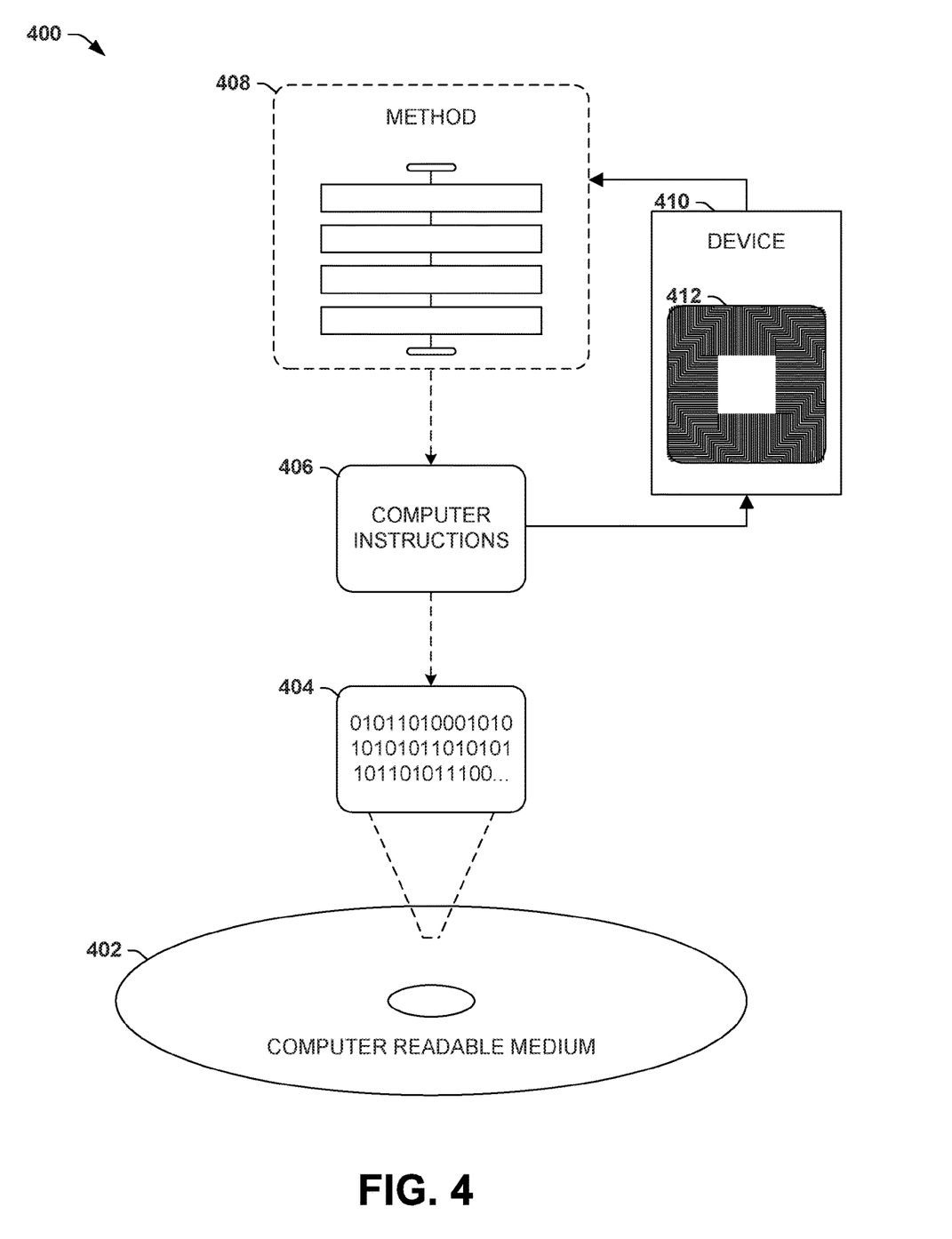
FIG. 4 is an illustration of an exemplary computer-readable medium comprising processor-executable instructions configured to embody one or more of the provisions set forth herein.

An exemplary computer-readable medium that may be devised in these ways is illustrated in FIG. 4, wherein the implementation 400 comprises a computer-readable medium 402 (e.g., a CD-R, DVD-R, or a platter of a hard disk drive), on which is encoded computer-readable data 404. This computer-readable data 404 in turn comprises a set of computer instructions 406 configured to operate according to the principles set forth herein. Some embodiments of this computer-readable medium may comprise a computer-readable storage medium (e.g., a hard disk drive, an optical disc, or a flash memory device) that is configured to store processor-executable instructions configured in this manner that, when executed on a processor 412 of a device 410, cause the device to perform the techniques presented herein. For example, the processor-executable instructions 406 may be configured to cause the device 410 to perform a method of applying a language 108 selected by a user 104, such as the exemplary method 300 of FIG. 3. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3) to confer individual and/or synergistic advantages upon such embodiments.

D1. Scenarios

A first aspect that may vary among embodiments of these techniques relates to the scenarios wherein such techniques may be implemented.

As a first variation of this first aspect, the techniques presented herein may be applied with many types of devices 102, such as workstations; servers; consoles; and mobile devices such as notebook computers, palmtop computers, mobile phones, portable media players, and portable gaming devices.

As a second variation of this first aspect, the login process 114 may be presented at many login stages of the device 102 and/or operating system 104. For example, the login process 114 may be presented during an initial user registration of the user 106 with the computing environment; an initiation of a user session of the user 106 within the computing environment (e.g., a new login of a currently logged-out user 106); a resumption of a suspended user session of the user 106 within the computing environment (e.g., a lock screen presented during a temporary absence of the user 106); and a transfer of a current user session of the user 106 to a different device 102 (e.g., a remote login from another device through a protocol such as terminal services).

As a third variation of this first aspect, the techniques presented herein may be implemented using various architectures. As a first example, the login process 114 may be provided by the device 102 or by the operating system 104, or may comprise a standalone application 106 or library that is separately installed on the device 104. As a second example, the login process 114 may be implemented as a hardware component (e.g., a circuit embedded in or inserted into the device 102), a software component that is installed within the computing environment of the operating system 104, or a combination thereof.

As a fourth variation of this first aspect, the login process 114 may involve many techniques for user identification and/or authentication, including a username or distinctive user identifier; a password or passphrase; a security token provided by an authentication device, e.g., in a multi-factor authentication protocol; questions about knowledge known only to the user; biometric identifiers such as face, voice, retina, or thumbprint recognition; or certificates, tickets, or tokens generated by other authenticating services. Additionally, the login process 114 may present many types of login interfaces 118 through which the user 106 may interact to complete the login process 114 (e.g., textboxes, on-screen keyboards and/or numeric keypads, and face and voice recognition techniques), as well as several types of hardware input devices (e.g., a keyboard or keypad, a pointing device such as a mouse or touch-sensitive display 116, a camera, a microphone, and a thumbprint or retina scanner).

As a fifth variation of this first aspect, the techniques presented herein may be applied to enable users 106 to select among a variety of languages 110. While the examples presented herein utilize naturally arising human languages 110 such as English, French, and German, the techniques may also be adapted to enable the selection of a range of natural and artificial languages 110 usable in a range of contexts such as print, verbal, and gestural communication with other users and/or devices. For example, the concepts presented herein may be applied for the selection of artificially designed languages such as Esperanto; fictional languages such as pirate and Klingon; gestural languages such as American Sign Language and semaphore; tactile languages such as Braille; language encodings such as Morse; and functional languages such as C and Java. The techniques presented herein may enable many such types of selections, and may involve configuring the operating system 104 to adapt the login process 114 in various ways to reflect such selections.

Figure 5:
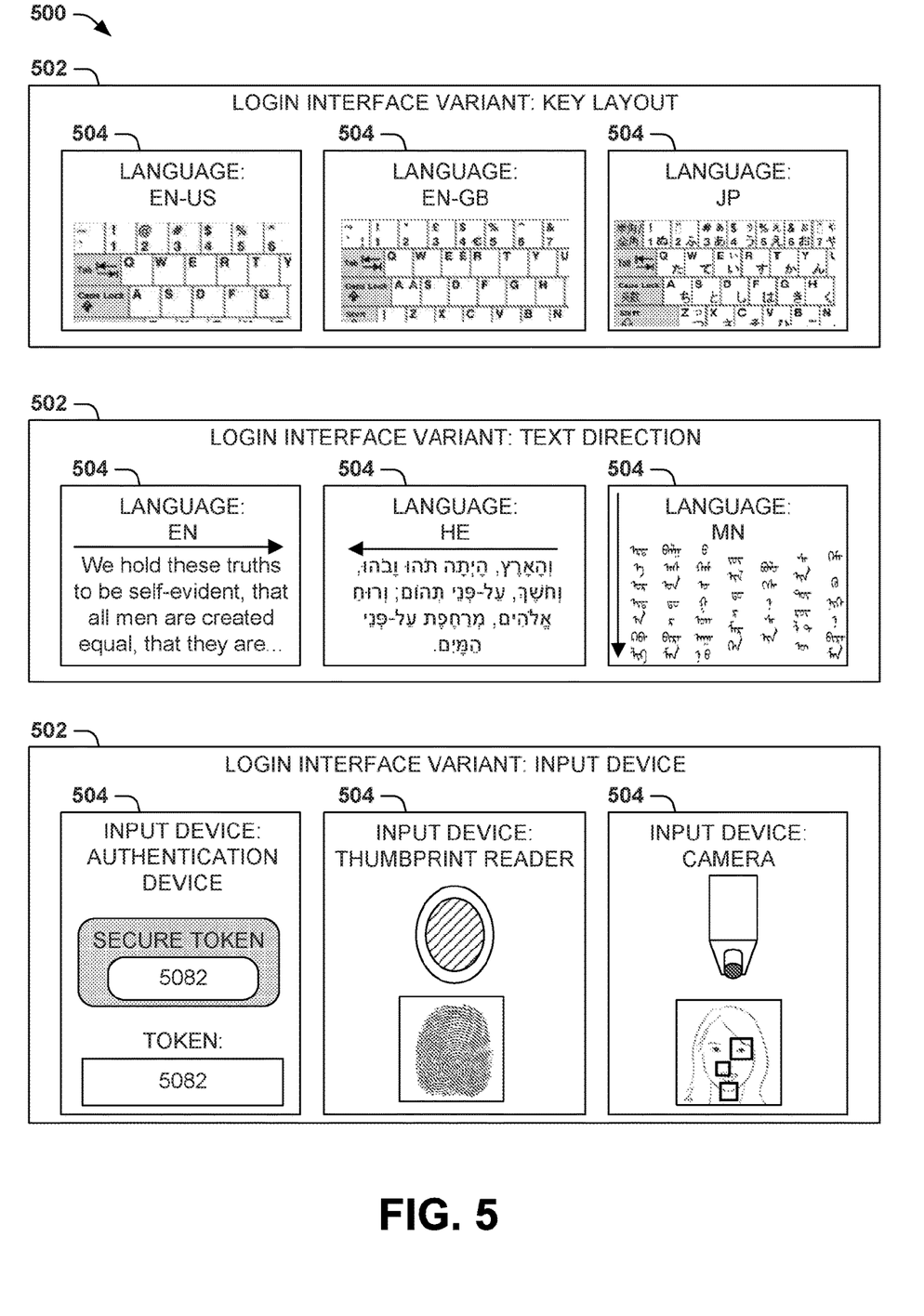
FIG. 5 is an illustration of an exemplary scenario featuring a set of login interface variants for respective aspects of login interfaces.

FIG. 5 presents an illustration of an exemplary scenario 500 featuring several types of login interface variants 502 that may be associated with different languages 110 and featured in different login interfaces 118. As a first example, the login interfaces 118 may present different key layouts 504 for an on-screen keyboard or keyboard input device, such as an ANSI mechanical layout that is associated with the American English language 110; an ISO mechanical layout that is associated with a UK English language 110; and a Japanese mechanical layout that is associated with a Japanese language 110. As a second example, the login interfaces 118 may present displayed text and/or user interfaces (such as textboxes) according to a text direction 504, such as a left-to-right text direction associated with an English language 110, a right-to-left text direction associated with a Hebrew language 110, and a vertical left-to-right text direction associated with a Mongolian language 110. As a third example, the login interfaces 118 may be associated with different hardware devices 504, such as a secure token authentication device that is configured to provide a periodically shifting numeric token that the user 106 may read and input into a textbox; a thumbprint reader device configured to scan a thumbprint of the user 106; and a camera configured to detect identifying facial features of the user 106. These and other scenarios and variations may be compatible with the techniques presented herein.

D2. User Information Storage

A second aspect that may vary among embodiments of these techniques involves the manner in which the login process 114 stores and accesses the associations 202 of login interfaces 118 with various user accounts 108.

As a first variation of this second aspect, the associations 202 may identify many types of user accounts 108, including a local user profile that is stored locally on the device 102; a roaming user profile that is accessible to the device 102 over a network; and a user directory entry of the user 102 in a user directory (e.g., an LDAP server or a contacts database). The association 202 may also identify a user account 108 associated with a different service, such as a social network profile of the user 106 in a social network that identifies the user's languages 110.

As a second variation of this second aspect, the device 102 may store the associations 202 in various ways, particularly with respect to user accounts 108 that are securely stored by the device 102. As a first such example, for devices 102 that store user accounts 108 according to a security profile that restricts access until login completion of the login process 114, the associations 202 of user accounts 108 and selected login interfaces 118 may be stored outside of the user accounts 108 (either redundantly with information stored within the user accounts 108, or exclusively stored outside of the user accounts 108). For example, the device 102 may comprise a device registry having a user registry portion for respective users 106 that is accessible only after login completion of the login process 114 by the user 106, and a login registry portion (outside of the user registry portion) that is accessible to the device 102 and where the associations 202 are stored. While storing the information in a device registry may present some advantages, it may also create some difficulties; e.g., in a multi-user computing environment where a first user 106 is currently logged in, it may be desirable to disable the presentation of the selected login interfaces 118 associated with respective user accounts 108 in order to reduce conflicts over access to the device registry.

As a third variation of this second aspect, the associations 202 may be generated and/or updated in various ways. As a first such example, when the user 106 selects a login interface 118 during or after the login process 114, the device 102 may update the associations 202 to reflect the selected login interface 118. As a second such example, when the user 106 adjusts the computing environment after completing the login process 114 (e.g., selecting a language 110 or an accessibility feature to be used by the device 102 while communicating with the user 106), the device 102 may update the language settings 112 and other information within the user account 108, and may also update the associations 202 stored outside the user account 108 between the user account 108 and the selected login interfaces 118, in order to reflect the new selections during the next login process 114 of the user 106. Those of ordinary skill in the art may devise many such ways of storing and accessing the associations 202 in accordance with the techniques presented herein.

D3. Login Process

A third aspect that may vary among embodiments of these techniques relates to the stages and details of the login process 114.

As a first variation of this third aspect, the device 102 may be configured, before receiving a selection of a user account 108, to communicate with users through a default login interface 118, such as a default language 110.

As a second variation of this third aspect, the device 102 may enable a user 106 to select a login interface 118 during the login process 114, and may adjust the login process 114 to utilize the selected login interface 118.

As a first example of this second variation, the device 102 may be configured to present to the user 106 a set of available login interfaces 118 upon detecting a new user 106 of the device (e.g., either the first user 104 to access the device 102 upon activation, or a different user 104 of a device 102 that is already in use by others).

As a second such example, the device 102 may be configured to infer a selection of a language 110 and a corresponding login interface 118 based on various factors. For example, the device 102 may be configured to receive a type of user input from the user 106 (e.g., the user's name, an entry of text, or a speech segment), to infer a selected language 110 of the user 106 based on the user input (e.g., inferring a user's nationality and native language based on his or her name, or applying a natural-language parser to any input provided by the user 106 to identify the language of the user input), and to select a login interface 118 corresponding to the identified language 110.

As a third example of this second variation, the login process 114 may enumerate for the user 106 a set of available login interfaces 118, such as a list of languages 110 that are installed on the device 102 and applicable to the login process 114. Upon receiving a login selection of a login interface 118 from the user 106 during the login process 114 (e.g., a selection of a language 110 from the language list), the device 102 may present the login interface 118 associated with the login selection. In addition to the login interfaces 118 associated with a user account 108 of a user 106, the enumeration may include the default login interface 118. This may be advantageous, e.g., if the device 102 is incapable of presenting the login interfaces 118 associated with the user account 108 (e.g., the user 104 may select a Japanese language login interface 118, but the device 102 may include neither an input device with a Japanese mechanical layout nor a Japanese language on-screen keyboard, and the user 106 may only be able to complete the login process 114 using the default login interface 118 for the device 102). Alternatively or additionally, a user profile 108 of a user 106 may directly or indirectly exclude one or more login interfaces 118, e.g., that are not to be presented to or used by the user 106 during the login process 114 (e.g., an input device that a physically disabled user 106 is unable to manipulate, or an authentication technique that is deemed to be inaccurate or inadequately secure), and the device 102 may exclude these options from the enumeration of login interfaces 108 presented to the user 106.

As a third variation of this third aspect, the login process 114 may be configured to enable a user 106 to select a user account 108 in various ways. For example, the device 102 may initiate the login process 114 by enumerating for the user 106 the user accounts 108 available in the computing environment (e.g., the names of users 106 permitted to login to the device 102), and upon the user 106 selecting a user account 108, may present a login interface 118 associated with the selected user account 108 for the remainder of the login process 114. Alternatively, the device 102 may initiate the login process 114 by presenting a login account identifier interface (e.g., a textbox where a user 106 may enter a username or other user account identifier, or instructions for the user 106 to present a biometric identifier or security badge).

As a fourth variation of this third aspect, the login process 114 may enable a user 106 to present a request for a particular a login interface 118, and if the requested login interface is not currently available, the device 102 may endeavor to retrieve or generate the requested login interface 118 for the user 106. For example, the device 102 may have access to a login interface store that is capable of providing resources for various login interfaces 118 (e.g., translations in various languages 110 of the information provided in the login process 114). Upon receiving a user request for a login interface 118 that is not available on the device 102, the device 102 may request the specified login interface 118 from the login interface store, and, upon receiving the login interface 118, may present the login interface 118 to the user 106. In some scenarios, the login interfaces 118 may be distinctively identified by a login interface identifier (e.g., the ANSI-defined language code of the languages 110 for installed or retrievable user interfaces 118). The login process 114 may be configured to indicate the available and/or retrievable login interfaces 118 for the user 106 using these distinctive login interface identifiers, and may receive the user request specifying a login interface 118 according to its distinctive login interface identifier. In this manner, the device 102 may facilitate the login process 114 for a user 106 even if the requested login interface 118 is not currently available.

As a fifth variation of this third aspect, the login process 114 may adapt and present a login interface 118 with variants in many login interface variants based on the user's selected settings in addition to a login interface language variant (i.e., the language 110 used by the device 102 to communicate with the user 106 during the login process 114). As a first example, the user's settings may also specify a login interface accessibility variant (e.g., an accessibility adjustment of the computing environment of the device 102, such as a high-contrast color scheme and/or large font size for users 106 with poor vision, or a audio-only interface for users 106 with no vision). As a second example, the user's settings may include a login interface input device variant that specifies an input device through which the user 102 is permitted to achieve the login completion (e.g., the identification of trusted input components that have been inspected for security, or the types of input devices that are trusted by the security process; for example, a tightly secured device 102 may only permit users 106 to authenticate through highly trusted authentication mechanisms, such as retina scans, rather than less trusted authentication mechanisms, such as thumbprint scans). As a third example, the user's settings may specify aesthetic selections (e.g., a color scheme and font that the user 106 selects for the login process 118), and the login process 114 may adapt the login interface 118 according to these selections. Many such login interface variants may be designed and applied by the login process 114 in accordance with the techniques presented herein.

Figure 6:
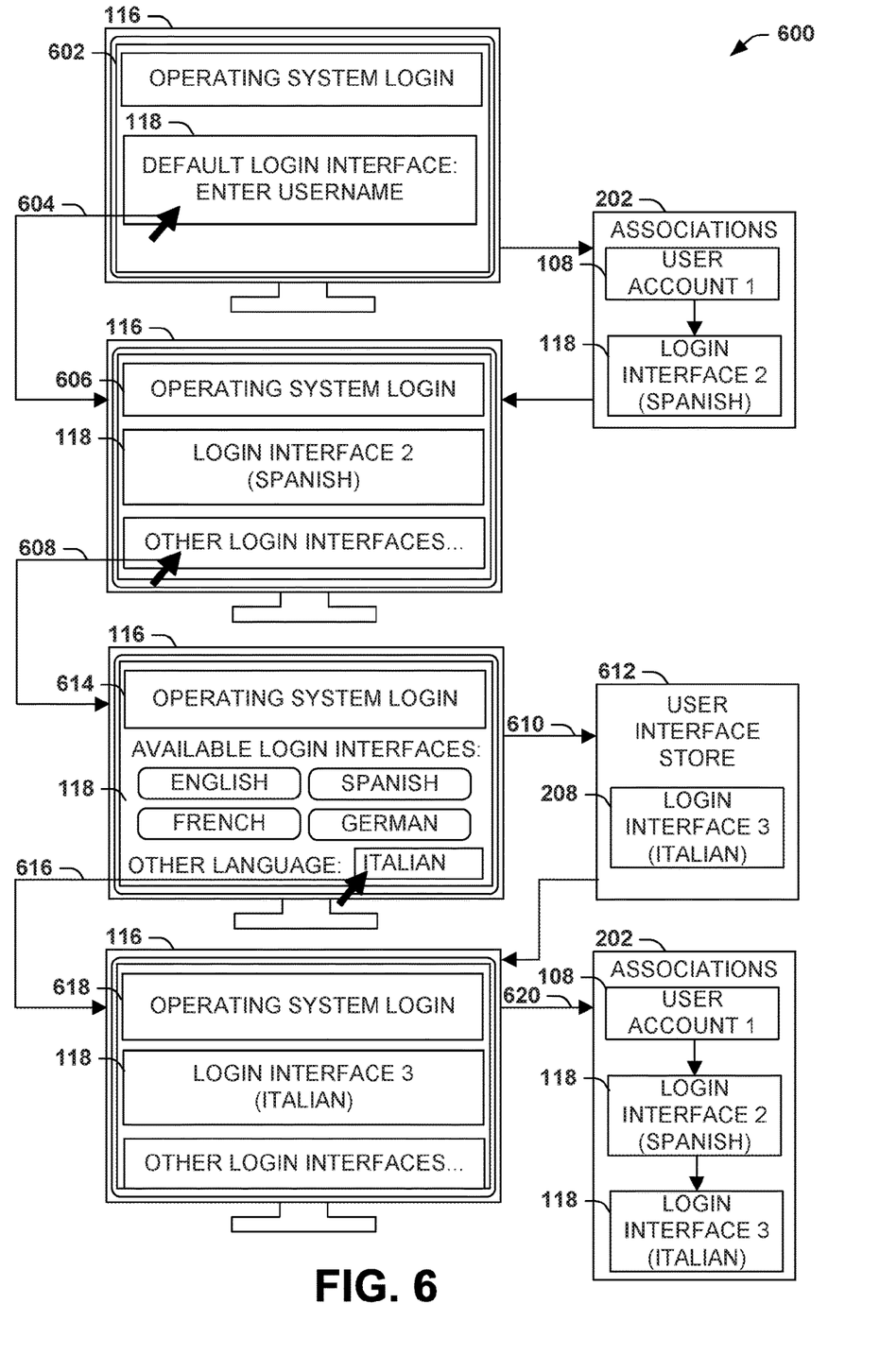
FIG. 6 is an illustration of an exemplary scenario featuring an interactive selection of login interfaces during a login process.

FIG. 6 presents an illustration of an exemplary scenario 600 featuring a sequence of login stages that together comprise an exemplary login process 114 in accordance with several of these variations of this third aspect. In this exemplary scenario 600, a first login presentation 602 involves a first login interface 118 soliciting a selection of a user account 108, e.g., a textbox wherein a username may be entered. When a user 106 selects 604 a user account 108, the device 102 may examine the associations 202 of the selected user account 108 with login interfaces 118, and may present a second login presentation 606 featuring the login interface 118 associated with the selected user account 108. However, the user 106 may select an option in the second login presentation 606 to specify a different login interface 118. The login process 114 may then present a third login presentation 614 enumerating the available login interfaces 118, and enabling the user 106 to specify a different login interface 118 according to a login interface identifier (e.g., the name of a language 110 that is not currently installed on the device 102). Upon receiving such a login interface identifier from the user 106, the device 102 may request 610 the specified login interface 118 from a login interface store 612. Upon receiving the login interface 118, the device 102 may present a fourth login presentation 618 featuring the selected login interface 118, and may also update the associations 202 of the user account 108 with the received login interface 118. In this manner, the device 102 may present the login process 114 using the login interfaces 118 suitable for respective users 106 in accordance with the techniques presented herein.

E. Computing Environment

Figure 7:
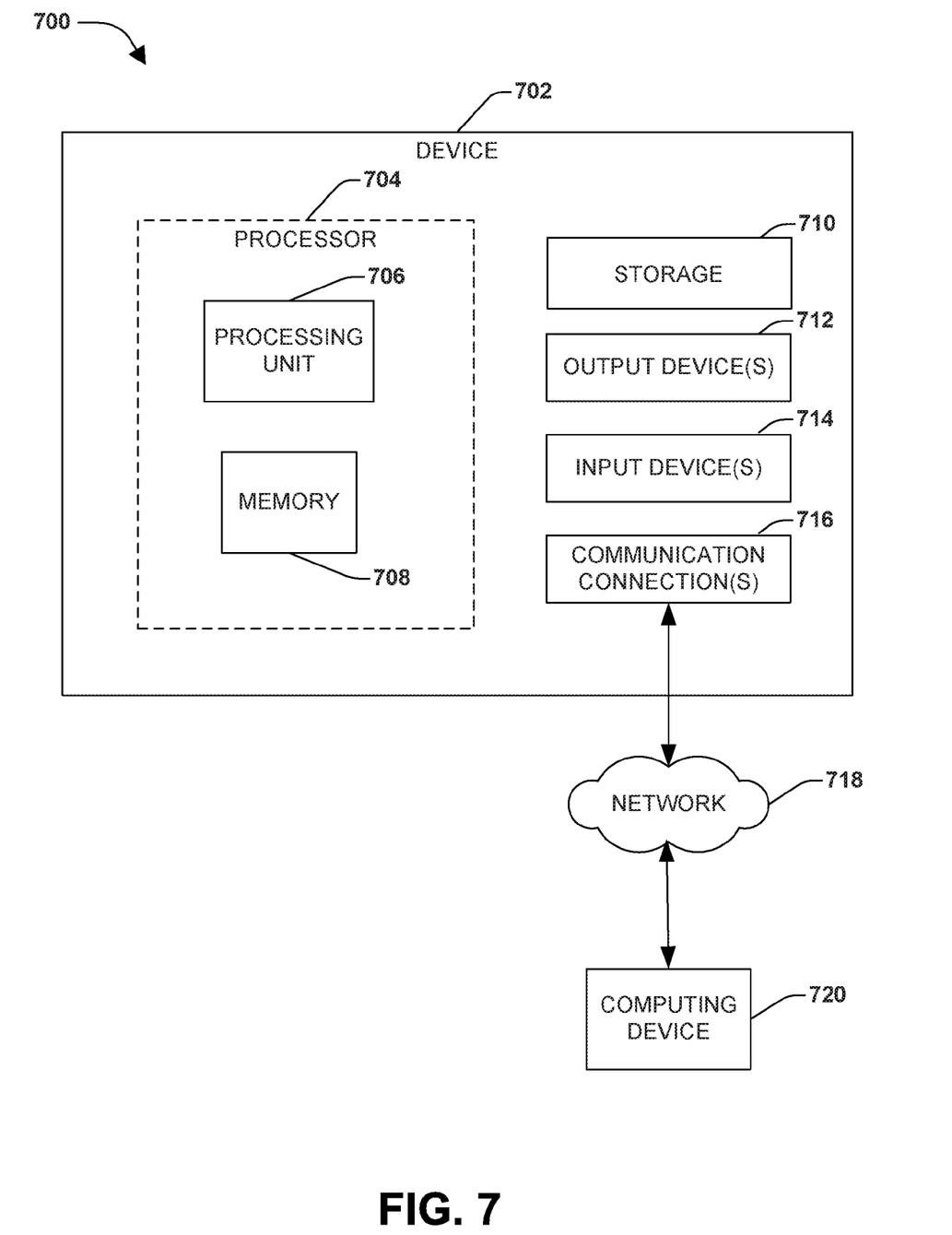
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example) or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In one embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Additionally, any reference to an application 108 may be applied to the operating system 124 executing on the device 102.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of admitting users to a computing environment using a login process, the method involving a hardware processor of a device and comprising:
executing, by the hardware processor, instructions that cause the device to: represent users according to user accounts by:
receiving, from a first user, a selection of a selected user interface setting from a set of login interfaces for the login process, and
recording the selected user interface setting in a user account of the first user to establish an association for the first user between the user account and the selected user interface setting; and
present the login process by:
receiving a login request from a current user, wherein the login request comprises a selection of a selected user account to login to the computing environment;
identifying the selected user interface setting that is associated with the selected user account;
from at least two login interfaces of the set of login interfaces that are respectively associated with a user interface setting used by the device to communicate with users, selecting a selected login interface that is associated with the selected user interface setting;
presenting the selected login interface to the current user; and
responsive to a successful login by the current user through the selected login interface, admitting the current user to the computing environment according to the selected user account.

2. The method of claim 1, the instructions configured to present the selected login interface during a login stage selected from a login stage set comprising:
an initial user registration of the user with the computing environment;
an initiation of a user session of the user within the computing environment;
a resumption of a suspended user session of the user within the computing environment; and
a transfer of a current user session of the user to a different device.

3. The method of claim 1, the login interfaces presenting login interface variants selected from a login interface variant set comprising:
a login interface language variant representing a language used by the device to communicate with the user;
a login interface accessibility variant specifying an accessibility adjustment of the computing environment of the device; and
a login interface input device variant specifying an input device through which the user achieves the login completion.

4. The method of claim 1, presenting a selected login interface associated with a user account comprising: retrieving the selected login interface from the user account selected from a user account set comprising:
a local user profile:
a roaming user profile;
a user directory entry of the user in a user directory; and
a social network profile of the user in a social network.

5. The method of claim 1:
the device configured to store user accounts according to a security protocol that restricts access to the user accounts until the login completion; and
the instructions further configured to associate the selected login interfaces with the user accounts outside of the security protocol.

6. The method of claim 5, the device comprising a device registry comprising:
for respective user accounts, a user registry portion that is accessible only after the login completion of the user; and
a login registry portion accessible to the device outside of the user registry portions and associating respective user accounts with the selected login interfaces.

7. The method of claim 6, the instructions further configured to, upon receiving from a user, after login completion, a selection of a selected login interface, update the login registry portion of the device registry by associating the selected login interface with the user account.

8. The method of claim 6, the instructions further configured to, upon receiving a selection of a user account of a first user while a second user has been admitted to the computing environment:
disable the presenting of a selected login interface, and present to the user a default login interface.

9. The method of claim 1, the instructions further configured to, before receiving from a user a selection of a user account, present at least one default login interface.

10. The method of claim 1, presenting the selected login interface comprising:
enumerate for the user at least two login interfaces including the selected login interface; and
upon receiving from the user a login selection of a login interface, present the login interface identified by the login selection.

11. The method of claim 10, enumerating the login interfaces comprising:
enumerating for the user the selected login interface and at least one default login interface.

12. The method of claim 11, enumerating the login interfaces comprising:
excluding at least one excluded login interface that is excluded from the user account of the user.

13. The method of claim 10, the instructions further configured to, upon receiving the login selection of the login interface from the user, associate the login interface identified by the login selection with the user account of the user.

14. The method of claim 1:
the device having access to a login interface store providing resources for login interfaces; and
the instructions further configured to, upon receiving from a user, before receiving the login completion, a login request for a login interface that is not available on the device:
request from the login interface store the login interface identified by the login request; and
upon receiving the login interface from the login interface store, present the login interface to the user.

15. The method of claim 14:
respective login interfaces distinctively identified by a login interface identifier; and
the login request specifying the login interface identifier of the login interface.

16. The method of claim 15, the instructions further configured to present to the user the login interface identifiers of login interfaces that are available from the login interface store.

17. The method of claim 1:
receiving from the user the selection of the user account comprising:
presenting to the user a login account identifier interface; and
receiving from the user, through the login account identifier interface, an account identifier of the user account of the user.

18. The method of claim 1, receiving from the user the selection of the user account comprising:
enumerating the user accounts for the user; and
receiving from the user a selection of a user account.

19. A device that admits users to a computing environment using a login process comprising at least two login interfaces that are respectively associated with a user interface setting used by the device to communicate with users, the device comprising:
a hardware processor; and
a memory storing instructions that, when executed by the hardware processor, cause the device to:
represent users according to user accounts by:
receiving, from a first user, a selection of a selected user interface setting from the at least two login interfaces for the login process, and
recording the selected user interface setting in a user account of the first user to establish an association for the first user between the user account and the selected user interface setting; and
present the login process by:
receiving a login request from a current user, wherein the login request comprises a selection of a selected user account to login to the computing environment;
identifying the selected user interface setting that is associated with the selected user account;
from the at least two login interfaces that are respectively associated with the user interface setting used by the device to communicate with users, selecting a selected login interface that is associated with the selected user interface setting;
presenting the selected login interface to the current user; and
responsive to a successful login by the current user through the selected login interface, admitting the current user to the computing environment according to the selected user account.

20. A system that admits users to a computing environment using a login process, the system comprising:
a hardware processor;
a user account store that represents users according to user accounts by:
receiving, from a first user, a selection of a selected user interface setting from a set of login interfaces for the login process, and
recording the selected user interface setting in a user account of the first user to establish an association for the first user between the user account and the selected user interface setting; and
a login process that admits users to the computing environment by:
receiving a login request from a current user, wherein the login request comprises a selection of a selected user account to login to the computing environment;
identifying the selected user interface setting that is associated with the selected user account;
from at least two login interfaces of the set of login interfaces that are respectively associated with a user interface setting used by the device to communicate with users, selecting a selected login interface that is associated with the selected user interface setting;
presenting the selected login interface to the current user; and
responsive to a successful login by the current user through the selected login interface, admitting the current user to the computing environment according to the selected user account.

\* \* \* \* \*